United States Patent Office 3,751,538
Patented Aug. 7, 1973

3,751,538
FABRICATION OF NUCLEAR FUEL PELLETS
Alfred Jean Flipot, Geel, and Robert E. M. Gilissen, Mol, Belgium, assignors to Belgonucleaire, S.A., and Centre d'Etude l'Energie Nucleaire, both of Brussels, Belgium
No Drawing. Filed Feb. 25, 1970, Ser. No. 14,226
Int. Cl. G21c 21/00
U.S. Cl. 264—.5
4 Claims

ABSTRACT OF THE DISCLOSURE

The specification discloses nuclear fuel pellets containing small amounts of barium in an amount sufficient to lower the bulk density of the pellets, and a process of controlling the bulk density of such pellets based on the addition of barium.

BACKGROUND OF THE INVENTION

The present invention relates to nuclear reactor fuel and more particularly to the fabrication of fuel pellets.

Fuel pellets are usually manufactured from ceramic powder, such as for instance one or more oxides and/or carbides of uranium, plutonium and/or other transuranium elements. After possible addition of a binder, the powder is conventionally granulated, pelletized and sintered to produce pellets having bulk densities within a predetermined range, normally 70 to 98% of the theoretical density of the raw materials.

As each type of fuel pellet generally has an optimum bulk density at which it performs best in a given type of reactor, controlling the bulk density of a batch of pellets undergoing manufacture is a matter of significant importance. Also, the ability to obtain reproducible density from one batch to another and from one pellet to another within the same batch are likewise important. However, production of pellets of a preselected density and the achievement of reproducibility between and within batches of fuel pellets constitutes a difficult problem.

At least in part, the problem is attributable to operating difficulties and economic penalties associated with attempts to inhibit the development of excessive density in the pellets. For instance, when a trend towards excessive density development is noted in a given production cycle, this trend has been countered heretofore by increasing the quantity of binder introduced into the pellet forming mixture prior to granulation. However, a side-effect of reducing the average bulk density of the pellets in this manner is the frustration of homogeneous dispersion of the binder in the powder. Under such circumstances, water has been used to help the dispersion problem. But because of its moderating effect, the presence of water drastically restricts the amount of fissile material which may be processed within a chamber of a given volume. Also, fouling of the sintering oven and other problems have been experienced.

It is also possible to discourage excessive development of bulk density by certain high temperature preliminary treatments of the ceramic powder raw materials. However, such treatments not only increase the manufacturing process costs in their own right but also increase the abrasiveness of the ceramic powders, thus reducing the life of the pelletizing equipment.

It should be apparent therefore that a need remains for controlling the development of excessive bulk density in fuel, which require neither the use of excessive binder nor the pretreatment of the ceramic powders at high temperature. It is the object of the present invention to fulfill this need. Moreover, it is an object of the invention to provide improved nuclear fuel pellets. Also, it is an object of the invention to provide a nuclear reactor fuel pellet manufacturing method which avoids the presently prevailing process disadvantages while yielding pellets of a preselected density in a reproducible manner.

BRIEF DESCRIPTION OF THE INVENTION

The present invention provides improved nuclear reactor fuel pellets which include fissile ceramic powder with or without binder and barium as a sintering inhibitor, said pellets having a lower bulk density than otherwise identical pellets, identically treated, which do not include the aforementioned sintering inhibitors. Moreover, the invention provides a novel process of manufacturing fuel pellets, including the introduction of barium into the preparation procedure for sintered nuclear reactor fuel pellets.

The barium may be introduced into the aforementioned pellets or process in the form of a free metal or compounds, including both organic and inorganic compounds. If introduced as compounds, the compounds generally decompose at the temperatures involved in the sintering treatment. In any manufacturing procedure for the production of sintered fuel pellets, there are various preparation steps leading up to the production of the finished product, including manufacturing and conditioning of the ceramic powder raw material, precompression, granulation, and pellitizing. In the process of the invention, the inhibitor may be added at any point in the manufacturing process prior to pelletizing, it being understood that the conditions of introduction should be such as to permit uniform distribution of the inhibitor material throughout the remaining raw materials for the pellets. For instance, solid inhibitor may be finely ground with the ceramic fuel powder prior to pelletizing; or salts of the inhibitor and fissile atoms may be coprecipitated, dried, calcified and reduced to produce an oxide of a nuclear fuel compound containing coprecipitated inhibitor. In all other respects, the pellet production procedure, including sintering conditions, may be the same as are conventionally used.

The threshold of effectiveness of the barium, for inhibiting undesired bulk density increase on sintering is at the level of about 30 parts per million, calculated as metal, based on the weight of the pellets after sintering. Preferably, about 0.1% to about 1% is used. The exact amount of inhibitor required to produce a given bulk density in a particular pellet-forming mixture may readily be determined by those skilled in the art using simple empirical processes. In this connection attention is directed to the accompanying examples in which representative bulk density reduction of values are shown for different amounts of barium utilization.

It should be noted that it is possible to employ the barium sintering inhibitor(s) in a continuous production cycle wherein variations in the average bulk density of the sintered pellets are observed through periodic sampling of the products. As the bulk density of the sintered product is observed to increase, the amount of inhibitor added upstream in the overall manufacturing process is correspondingly increased to counter the trend of increasing bulk density. In a similar fashion, a downward deviation of bulk density from the preselected value may be countered by a corresponding reduction in the addition of the inhibitor(s). For instance, in a continuous production process in which the barium is uniformly distributed in the ceramic powder raw material prior to precompression thereof, the weight rate of addition of inhibitor(s) per unit of ceramic powder raw material is increased in response to an upward deviation of the bulk density of the sintered product from the desired level.

EXAMPLES

The following nonlimiting examples illustrate the practice of the invention. In the examples, all parts are by weight, unless the contrary is clearly indicated and the basis for the percentages of inhibitor employed is that set forth above.

Example 1

A small amount of barium nitrate is added to uranyl nitrate. The solution is afterwards treated under the usual conditions for $UO_2$ ceramic manufacturing. The method includes the steps of precipitation using ammonia, drying, calcination at 550° C. and reduction at 450° C. under hydrogen. The obtained product is an uranium dioxide ceramic containing co-precipitated barium impurity. The comparison of a $UO_2$ powder containing 370 p.p.m. of barium and a pure $UO_2$ powder manufactured under the same conditions gives the following results: the two samples of powders are pelletized without addition of any organic or other material, up to a green density of 5.5 g./cm.$^3$ and sintered for 3 hours at 1600° C. under an atmosphere constituted of a mixture of 95% argon and 5% hydrogen. Under these conditions, the pure $UO_2$ powder provides pellets having a density of 10.35 (or about 94.4% of the theoretical density) whereas pellets containing 370 p.p.m. of barium reach only a density of 10.07 g./cm.$^3$ (or 91.9% of the theoretical density).

Example 2

A depleted $UO_2$ ceramic has been mixed with 0.06% of barium carbonate (inhibitor) and 0.3% of zinc stearate (lubricant), then finely ground for 30 minutes in a ball-mill. The obtained powder is precompressed at 2000 kg./cm.$^2$, granulated, pelletized at a green density of 5.6 g./cm.$^3$, and afterwards sintered for 1 hour at 1600° C. under hydrogen. After sintering, the density of the pellets is 9.15 g./cm.$^3$ or 83.5% of the theoretical density.

In conclusion, while the foregoing specification describes certain preferred embodiments of the present invention, it is to be understood that we do not intend to limit ourselves to the precise formulations herein disclosed, since the practice of the invention may be varied to a considerable extent by any person skilled in the art without really departing from the basic principles and novel teachings of this invention.

What we desire to protect by U.S. Letters Patent is:

1. A method for manufacturing nuclear fuel pellets of controlled bulk density comprising forming a mixture of ceramic nuclear fuel powder with from 30 parts per million to 1% by weight of barium calculated as metal, based on sintered pellet weight, compressing said mixture to form pellets therefrom, sintering the resultant pellets and recovering pellets of a lower bulk density than exhibited by other identical pellets, identically treated, which do not include the aforesaid barium.

2. A method according to claim 1 in which the powder is precompressed and granulated before it is pelletized.

3. A method according to claim 1 in which the quantity of barium is less than 0.1%.

4. A method according to claim 1 wherein the barium is present in the form of a compound which decomposes during sintering.

References Cited

UNITED STATES PATENTS

| | | | |
|---|---|---|---|
| 3,141,782 | 7/1964 | Livey et al. | 23—354 X |
| 3,504,058 | 3 1970 | Masselot | 264—0.5 |
| 3,342,744 | 9/1967 | Elyard et al. | 252—301.1 |
| 3,194,852 | 7/1965 | Lloyd et al. | 264—0.5 X |
| 2,868,707 | 1/1959 | Alter et al. | 252—301.1 |
| 3,275,564 | 9/1966 | Pascard | 252—301.1 |
| 3,338,989 | 8/1967 | Russell et al. | 264—0.5 |
| 3,404,201 | 10/1968 | Braun et al. | 264—0.5 |

FOREIGN PATENTS

| | | | |
|---|---|---|---|
| 269,388 | 1/1964 | Australia | 252—301.1 |

OTHER REFERENCES

Houston, "Sintering Behavior of Plutonium Dioxide," Nuclear Science Abstracts, vol. 19, No. 21, 1965, Abst. No. 40981, p. 5115.

Puechl, "Development of Plutonium-Bearing Fuel Materials," Nuc. Sci. Abstracts, vol. 17, No. 21, 1963, Abst. No. 36253, p. 4860.

CARL D. QUARFORTH, Primary Examiner

R. L. TATE, Assistant Examiner

U.S. Cl. X.R.

252—301.1 R